Dec. 22, 1925.　　　M. M. HARRISON　　　1,566,863
PANEL AND METHOD OF MAKING THE SAME
Filed August 5, 1925
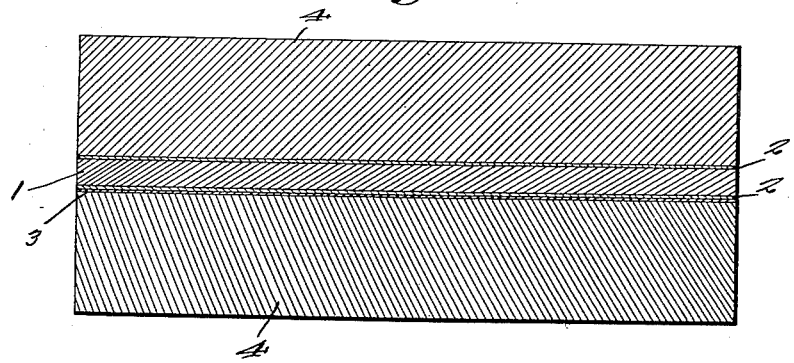
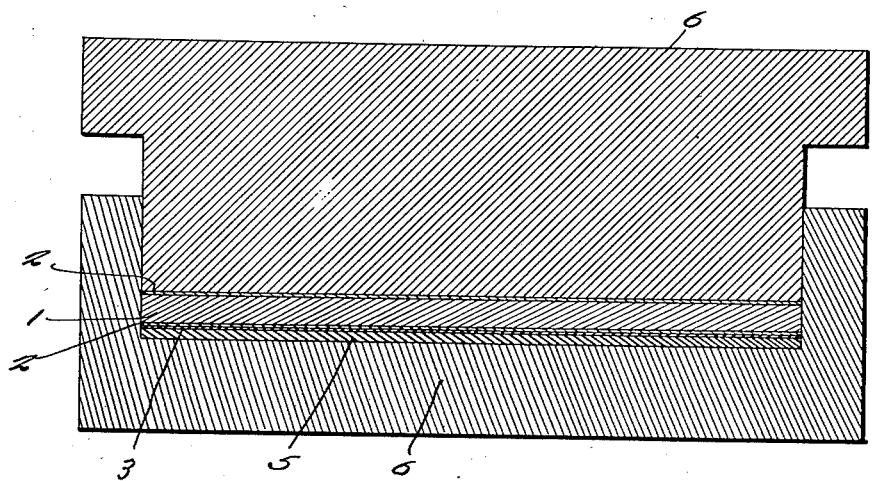
Inventor
Marion M. Harrison
By Spear, Middleton, Donaldson, Hall
Attorney Patented Dec. 22, 1925.

1,566,863

UNITED STATES PATENT OFFICE.

MARION M. HARRISON, OF AKRON, OHIO, ASSIGNOR TO THE MILLER RUBBER COMPANY, OF AKRON, OHIO, A CORPORATION OF OHIO.

PANEL AND METHOD OF MAKING THE SAME.

Application filed August 5, 1925. Serial No. 48,315.

*To all whom it may concern:*

Be it known that I, MARION M. HARRISON, citizen of the United States, and resident of Akron, in the county of Summit and State of Ohio, have invented certain new and useful Improvements in Panels and Methods of Making the Same, of which the following is a specification.

My present invention relates to improvements in panels and method of making the same, designed more especially for use in connection with radio cabinets and the like, where it is desired to form the panel, box, or cabinet of hard rubber with a surfacing of wood veneer to give the article the appearance of a polished or highly finished wood article.

Veneers coated or finished with a phenol-formaldehyde artificial resin have been found to be desirable as the surfacing of such a panel or cabinet, but some difficulty has been experienced in producing a perfect union between the hard rubber and the veneer. A better union can be effected where the veneer is coated on only one side with such artificial resin and the rubber is juxtaposed to the uncoated surface, but it has been found that in such cases there is a tendency for the heat of the mold to drive the artificial resin away from the mold surface through the wood veneer, leaving a poor finish in spots on the outside of the article.

These objections are obviated by the present invention, which includes the novel method and article hereinafter described and defined by the appended claims.

In order that my invention may be better understood, I have appended hereto an explanatory drawing, in which:—

Figure 1 is a sectional view showing wood veneer with a fibrous backing, confined between press plates.

Fig. 2 is a similar view showing the laminated panel confined between mold plates for effecting the vulcanization.

In proceeding according to my invention, I provide a layer of wood veneer at 1, which is coated on both sides with a phenol-formaldehyde artificial resin, indicated at 2, (it being understood that the drawing is on an exaggerated scale for illustrative purposes). The coatings are merely dried on the wood and hence do not penetrate the same and does not present a veneered appearance. A relatively thin layer of fibrous material such, for example, as a sheet of paper 3, is applied to one of the coated surfaces and the veneer with its juxtaposed fibrous layer is placed between press plates 4 which are heated to a sufficient temperature to soften the coating, whereby the sheet of paper or other fibrous material, is caused to adhere to the coated surface of the wood. Thereafter the paper backed veneer is removed from the press and a sheet or layer 5 of hard rubber compound is applied to the paper backing and the laminated sheet thus formed is placed between mold plates 6 which are adapted to be heated to a temperature sufficient to effect the vulcanization of the rubber compound. This, in addition to the vulcanizing of the rubber compound, causes it to be vulcanized firmly to the fibrous backing and also operates on the coating in such a manner that the fabric is firmly bound to the back coated surface of the veneer, while the smooth or finished surface of the mold imparts a polished finish to the exposed coated surface of the veneer.

In some cases the paper may be coated with a rubber cement, although in practice I find that this is not necessary.

Having thus described my invention, what I claim is:—

1. The hereindescribed method of forming panels for radio cabinets and analogous purposes, which consists in coating a wood veneer sheet with a phenol-formaldehyde artificial resin, applying to one surface thereof a sheet of fibrous material, juxtaposing a sheet of rubber compound to said fibrous material, and subjecting the laminated sheet to vulcanizing heat and pressure in a suitable mold.

2. The hereindescribed method of forming a panel, which consists in coating both surfaces of a wood veneer sheet with a phenol-formaldehyde artificial resin, applying to one of said surfaces a sheet of fibrous material, subjecting the juxtaposed sheets to heat and pressure, applying to the fibrous surface a sheet of rubber compound, and subjecting the laminated sheet thus formed to vulcanizing heat and pressure in a suitable mold.

3. A laminated panel comprising a wood veneer, having a coating of phenol-formaldehyde artificial resin, a layer of vulcanized rubber, and an interposed sheet of fibrous material, the whole being vulcanized together.

In testimony whereof I affix my signature.

MARION M. HARRISON.